Nov. 15, 1938.   B. E. LENEHAN   2,137,090
TELEMETERING APPARATUS
Filed Aug. 15, 1935
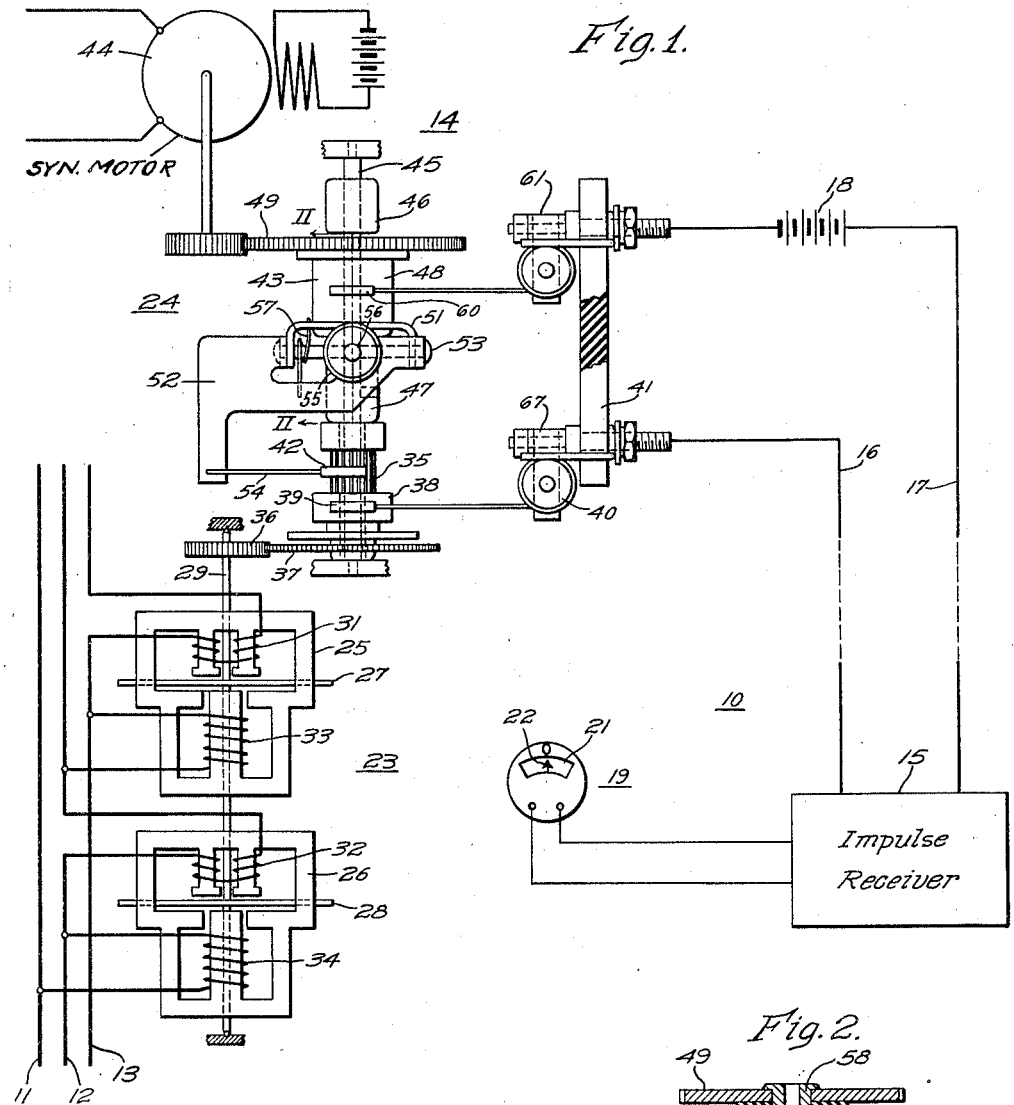
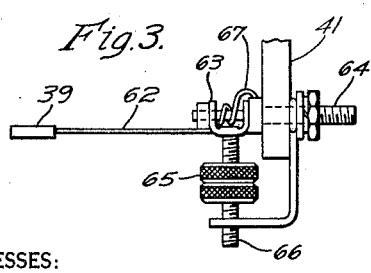
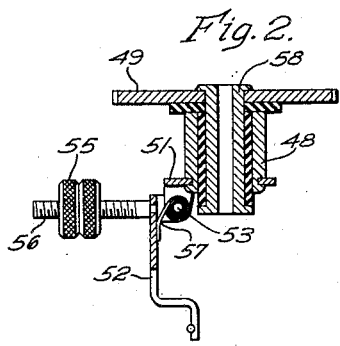
WITNESSES:
INVENTOR
Bernard E. Lenehan.
BY
ATTORNEY Patented Nov. 15, 1938

2,137,090

UNITED STATES PATENT OFFICE 2,137,090

TELEMETERING APPARATUS

Bernard E. Lenehan, Bloomfield, N. J., assignor to Westinghouse Electric & Manufacturing Company, East Pittsburgh, Pa., a corporation of Pennsylvania Application August 15, 1935, Serial No. 36,343

2 Claims. (Cl. 200—28)

The invention relates, generally, to telemetering apparatus and systems, and more particularly, to current impulse transmitters or senders and systems of the base rate type suitable for indicating or recording, or both, the magnitude and direction of flow of a medium such, for example, as electrical power.

Heretofore, attempts have been made to successfully and accurately measure and indicate or record at a remote point the quantity and direction of power flowing through an electrical circuit. An ordinary impulse telemetering system is not suitable for such applications since it cannot distinguish one direction of power flow from the other and sends the same number of impulses and gives the same indication or record for equal amounts of power flow in both directions. Attempts have been made to overcome this defect by utilizing an extra element on the measuring device or watt-hour meter to apply a constant torque to cause the meter to operate at some desired speed of the order of about 25 revolutions per minute at no load. Upon an increase in load in one direction, the meter would rotate at a higher speed and at a lower speed when the load increased from zero in the opposite direction. It has been found that systems of this nature do not function in a satisfactory manner, are complicated and expensive to manufacture, and maintain, and do not have a fixed predeterminable base rate.

It is, therefore, the purpose of the present invention to provide for overcoming the disadvantages of the prior art systems by providing telemetering apparatus of this general kind which shall be of simple construction, efficient in operation and which may be readily and economically manufactured, installed and maintained.

A more specific object of the invention is to provide a telemetering system and impulse transmitter therefor which may be utilized to provide an accurate indication or record at a remote point of the magnitude and direction of electrical or mechanical values.

Another object of the invention is to provide for transmitting current impulses in a telemetering system at a rate which is proportional to the magnitude and direction of an electrical or mechanical value.

A still further object of the invention is to provide an impulse transmitter or sender for telemetering systems of the impulse type which functions to transmit impulses at a predetermined base rate under no-load or zero conditions, and which automatically adds to or subtracts from the base rate of impulses in accordance with the magnitude and direction of the power flow or other value or characteristic.

These and other objects and advantages of the invention will become more apparent from a study of the following detailed description of the invention, in conjunction with the drawing, in which:

Figure 1 is a combined mechanical and diagrammatic view of an impulse transmitter and system embodying the principal features of the invention;

Fig. 2 is a sectional view taken along line II—II of Fig. 1, showing the details of construction of the rotating brush element of the transmitter; and Fig. 3 is a top plan view showing the structural arrangement of the stationary brush elements of the transmitter.

Referring to the drawing, there is illustrated a preferred embodiment of the invention as it may be utilized for indicating or recording at a remote station 10 the magnitude and direction of power flowing in an electrical circuit represented by conductors 11, 12 and 13. The system comprises, in general, an impulse transmitter 14 at the sending station, which transmits current impulses to a suitable impulse receiver 15 at the remote station 10 over line conductors 16 and 17 energized by a source of current 18.

The impulse receiver 15 may be of any suitable and well known type which responds to the rate at which impulses are received over the circuit 16, 17, and controls the operation of an indicating or recording meter 19. In this instance, the meter 19 is illustrated as an indicating instrument having a suitable scale 21 and pointer 22. As will be further described, the zero of the scale 21 in this instance corresponds to the desired base rate at which the impulses are transmitted from the transmitting station, and deflects in opposite directions from the zero position dependent upon the magnitude and direction of power flow in the circuit represented by conductors 11, 12 and 13.

The transmitter 14 comprises a measuring element 23 which is utilized to actuate a contact making device 24. The measuring element is in the form of a conventional three-phase watt-hour meter comprising two measuring elements 25 and 26 having their moving elements 27 and 28 mounted on a common drive shaft 29 and their current coils 31 and 32 and voltage coils 33 and 34, respectively, connected to measure the power flowing in the three-phase circuit 11, 12 and 13. As will be readily understood, the meter shaft 29 rotates at a speed proportional to the quantity of power flow and in a direction dependent on the direction of power flow.

In order that the current impulses may be transmitted under load conditions at a rate in accordance with both the magnitude and direction of power flow, the contact making device 24 is so constructed that it transmits impulses at a predetermined constant rate, which may be termed the base rate, under no-load conditions or, in other words, when the measuring device 23 is not in operation.

In this instance, the contact making device 24 comprises a commutator 35 which is driven in accordance with the speed of operation of the measuring device 23 through the gears 36 and 37. The commutator 35 is provided with a slip ring 38 which engages a resiliently mounted stationary brush 39, supported by a holder 40, which is mounted upon a suitable support 41.

In order to cause the contact making device 24 to transmit impulses at a constant base rate, the brush 42 which engages the commutator and which is of a stationary nature in the ordinary type of transmitter, is mounted upon a rotating element 43, which may be driven at a substantially constant speed in any suitable manner, such, for example, as by means of the synchronous motor 44, as shown.

The commutator 35 and rotating brush support 43 are mounted for rotation on a common shaft 45 and are suitably maintained in spaced relation by the adjustable collars 46 and 47.

The rotating brush support 43 comprises an insulated sleeve 48 which is connected to the motor 44 through a suitable reduction gear 49. A bracket 51 is secured to the sleeve on which is pivotally mounted a brush support or holder 52 by means of a pin 53. The brush 42 is secured to the support 52 by means of a resilient arm 54 and is urged in a contact making direction toward the commutator 35 by means of an adjustable weight 55 which is mounted upon an arm 56 secured to the brush support 52, as best shown in Fig. 2. A shunt connection 57 is provided between the bracket 51 and support 52 to conduct the current impulses between the brush 42 and the sleeve 48.

As will be apparent, the arrangement provided for supporting and rotating the brush 42 is of such nature that the brush may be revolved about or moved relative to the commutator 35, and constantly maintained in good contact making condition.

As shown in Fig. 2, the sleeve 48, which functions to rotate the brush support 52, is insulated from the gear 49 and from the mounting sleeve 58, which makes it possible to use it as a slip ring to engage a second resiliently mounted stationary brush 60 supported by brushholder 61 and thereby complete the electrical circuit of the contact making device.

Referring to Fig. 3, it will be observed that the stationary brush 39 is mounted upon a flexible or resilient supporting arm 62 secured to a bracket 63, which is rotatably mounted upon the contact stud 64 in the support 41. The brush is urged in contact making direction against the slip ring 38 by means of an adjustable weight 65 mounted upon a threaded arm 66, which is secured to the bracket 63. A shunt 67 is utilized to provide an electrical connection between the brush 39 and the contact stud 64. The construction of the brushholder 61 is similar to that of the holder 40 and requires no detailed description.

In view of the foregoing description, it will be readily understood that when the rotatable element 43 of the contact making device 24 is stationary, the rate at which impulses are transmitted is proportional to the speed of the measuring device 23. When, however, the rotatable element is being operated at a predetermined speed which determines the base rate, the rate at which impulses are transmitted then depends upon the relative speeds of the two devices. In practice, it is desirable to rotate the brush 42 in the opposite direction to the direction of rotation of the commutator 35 when power is flowing in the normal direction which causes the impulse rate to be greater than the base rate. When the flow of power is reversed, which reverses the direction of rotation of the commutator, the rate at which impulses are transmitted then becomes less than the base rate and thus operates the meter 19 to indicate both the magnitude and direction of power flow.

The advantages of the present invention over the prior art apparatus are now readily discernible. The base rate operation is obtained without the use of elements or devices which require voltage compensation or adjustment. The base rate is determined by the frequency of the power system, and consequently, may be readily subtracted at any other point on the power system when totalizing is involved. Kinetic friction is involved in the operation of the apparatus instead of static friction, which produces greater accuracy and better light load performance. The apparatus is of extremely simple construction, and therefore, more reliable in operation and more economical to manufacture than previously known apparatus of the same general nature.

It may be stated in conclusion that, while the illustrated example constitutes a practical embodiment of my invention, I do not wish to limit myself strictly to the exact details herein illustrated, since modifications of the same may be made without departing from the spirit of the invention, as defined in the appended claims.

I claim as my invention:

1. In an impulse transmitter for telemetering systems, in combination, a rotatable make and break element having a slip ring, a resiliently mounted stationary brush engaging said slip ring, a contact element engaging the make and break element, means for resiliently supporting and rotating the contact element around the make and break element, said means including a second slip ring, a pivotally mounted bracket to which the contact element is secured and means for biasing the pivotally mounted bracket in a direction to cause the contact element secured thereto to be urged toward the commutator, and a second resiliently mounted brush engaging the slip ring on said supporting and rotating means for the contact element.

2. In an impulse transmitter for telemetering systems, in combination, a rotatable make and break element having a slip ring, a sleeve rotatably mounted on the same axis as the make and break element, a second slip ring on said sleeve, resiliently mounted stationary brushes independently engaging said slip rings, a bracket member rotatably mounted on the sleeve on an axis at right angles to the axis of rotation of the sleeve, a contact element engaging the make and break element and resiliently secured to the bracket, adjustable means for constantly biasing the bracket in a direction to urge the contact element against the make and break element and means for rotating the sleeve.

BERNARD E. LENEHAN.